United States Patent [19]
Dickie

[11] Patent Number: 6,119,390
[45] Date of Patent: Sep. 19, 2000

[54] STRIPPING APRON

[76] Inventor: Ted Mac Dickie, 7930 FM 1783, Gatesville, Tex. 76528

[21] Appl. No.: 09/339,534
[22] Filed: Jun. 24, 1999
[51] Int. Cl.[7] ................................................ A01K 97/06
[52] U.S. Cl. .................................................... 43/54.1; 43/4
[58] Field of Search ................................ 43/1, 4.5, 54.1, 43/4

[56] References Cited

U.S. PATENT DOCUMENTS

| | | |
|---|---|---|
| 2,538,576 | 4/1951 | Mavrakis . |
| 2,687,834 | 7/1954 | Mathis . |
| 2,822,116 | 10/1958 | Smalley et al. . |
| 4,297,802 | 11/1981 | Normann . |
| 4,733,806 | 3/1988 | Sloop . |
| 5,182,877 | 2/1993 | Burchill et al. . |
| 5,542,204 | 8/1996 | Heaney ........................................... 43/4 |
| 5,628,141 | 5/1997 | Crawford . |
| 5,836,488 | 11/1998 | Priestley . |

*Primary Examiner*—Jack W. Lavinder
*Attorney, Agent, or Firm*—Larry Mason Lee

[57] ABSTRACT

A stripping apron suitable for use by fly fishermen to hold the accumulated fishing line which is gathered by hand by the fisherman as he attempts to simulate the movement of an insect across the water's surface while retrieving the fishing line that he had cast out over the water's surface. The disclosed stripping apron is a light-weight, adjustable, detachable, stream-lined line storage device ideally suited to the needs of the professional fly fisherman.

7 Claims, 3 Drawing Sheets

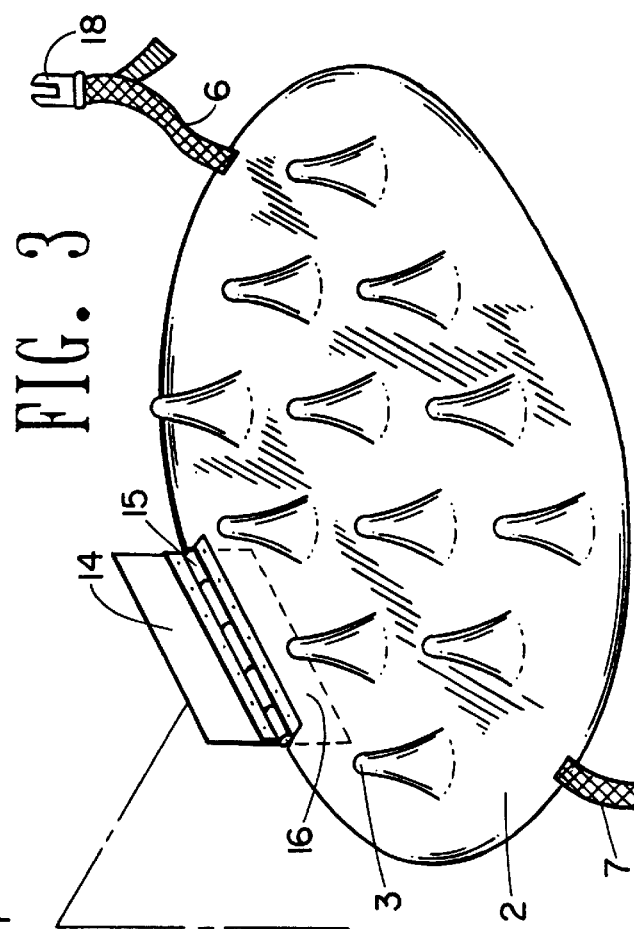
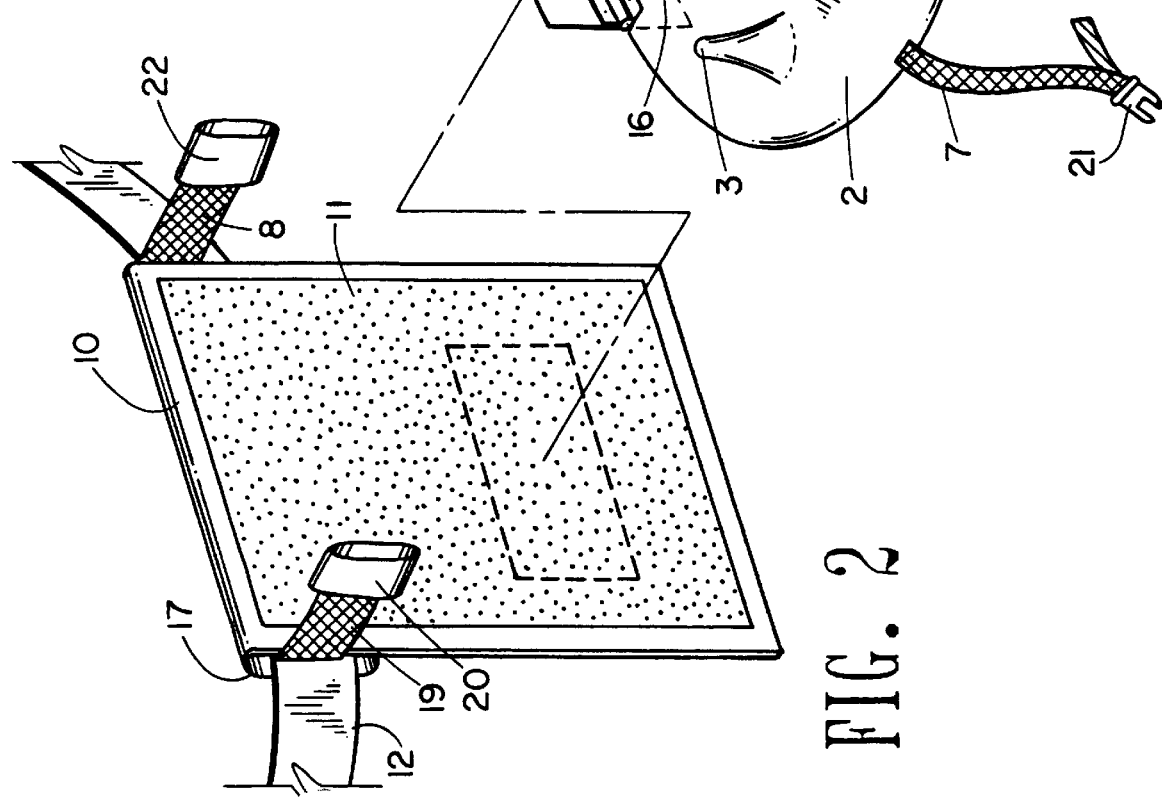

STRIPPING APRON

BACKGROUND OF THE INVENTION a. Field of the Invention

The present invention is related generally to the field of line stripping aprons. A stripping apron is used by fly-fishermen to gather by hand, rather than by reel, the fishing line connected to the "fly" or fishing lure which has been cast out onto the water in hopes of attracting the attention of a suitable fish. Without use of a stripping apron, the line would be retrieved and stored in an unsightly tangle near the feet of the fisherman. With use of a suitable stripping apron, the fishing line is retrieved and stored in an orderly, untangled, fashion which makes the fishing line easy to reel up and promptly available for another cast.

More particularly the present invention is related to line stripping aprons suitable for use in fly fishing which does not have the walls of a "basket" to interfere with the hand motions of the fisherman retrieving the fishing line, Yet more particularly, the present invention is related to line stripping aprons which may be easily and casually used by the fisherman without concentration and attention to its use.

Yet more particularly, the present invention is related to line stripping aprons which are not fixed in position upon the fisherman but rather may be disconnected and dropped into a hanging or vertical position which is out of the fisherman's way when not in use.

Yet more particularly, the present invention is related to line stripping aprons which are adjustable in configuration such that the position of the apron relative to the fisherman, wearer of the device, is adjustable to the various positions a fisherman may have to assume in order to accommodate the terrain while casting and retrieving his lure upon the waters.

Yet more particularly, the present invention is related to line stripping aprons which are lightweight and of streamlined, non-bulky contour so that they never become intrusive and never become a burden to the busy fly fisherman.

Yet more particularly, the present invention is related to line stripping aprons which are quickly and easily removable from the person of the fisherman and yet again quickly and easily reattached to his person when needed.

b. Description of the Prior Art

Stripping line baskets, such as that described in U.S. Pat. Nos. 5,182,877 and 5,628,141, are well known in the art. Additionally well known are various line routing and storing devices such as that described in U.S. Pat. No. 4,297,802. All of which baskets and devices address the problem of storing the fishing line attached to a "fly" or fishing lure which is cast from the reel by a fly fisherman, but retrieved or gathered in by hand in motions that attempt to simulate the motions of a fly or insect on the water surface. The problem of storage of the fishing line is that, unless some mechanism is used, the line will simply gather in the proximity of the fisherman in a disorganized mass or tangle.

Stripping line baskets have in common a single problem, the walls of the basket interfere with the hand motions of the fly fisherman while retrieving the fishing line. It is awkward to place the hand and the fishing line down into the basket and the hand often strikes or bumps into the wall of the basket in the heat of the moment while causing the fly or lure being retrieved appear to skip or dance across the surface of the water in simulation of an insect on the water's surface.

Line routing and storing devices have in common the problem that more concentration of the user on the placement of the fishing line onto the device is required than is comfortable in the heat of the quick-paced fishing action that hopefully accompanies their use. The device of U.S. Pat. No. 4,297,802 requires the user to wind the retrieved fishing line upon a cylinder by hand whilst simultaneously attending to the handling of the reel and the necessary hand motions causing the lures movement in simulation of an insect upon the water's surface.

All line storage devices currently used in fly fishing share the problem of being more or less fixed in position upon the fisherman, wearer of the device, requiring removal of the device during periods of even short duration when the fisherman pauses in his fishing activity.

All line storage devices currently used in fly fishing share the problem of being relatively rigid in their configuration such that the position of the device relative to the fisherman, wearer of the device, is fixed and non-adjustable which can become non-optimal in the various positions a fisherman may have to assume in order to accommodate the terrain while casting and retrieving his lure upon the waters.

Many line storage devices currently sued in fly fishing share the problem of their relative bulk and weight, and such devices become over the course of a lengthy fly fishing session a nuisance and perhaps a weighty nuisance.

Finally, all line storage devices currently known and used by fly fishermen require their complete removal from the person of the fisherman during periods of disuse. This removal involves the unbuckling of the belt portion of the device from around the waist of the fisherman and can become a time-consuming, bothersome activity especially when often repeated.

SUMMARY OF THE INVENTION

The instant invention is of a stripping apron suitable for use by fly fishermen to hold the accumulated fishing line which is gathered by hand by the fisherman as he attempts to simulate the movement of an insect across the water's surface while retrieving the fishing line that he had cast out over the water's surface. The numerous problems noted in the prior art line storage devices are addressed in the instant invention and the result is a light-weight, adjustable, detachable, streamlined line storage device or stripping apron ideally suited to the needs of the professional fly fisherman.

Accordingly, it is an object of this invention to provide a fishing line storage device which does not have the walls of a "basket" to interfere with the hand motions of the fisherman retrieving the fishing line.

It is a further object of the invention to provide a fishing line storage device which may be easily and casually used by the fisherman, without concentration and attention to its use.

It is a yet further object of the invention to provide a fishing line storage device which is not fixed in position upon the fisherman but rather may be disconnected and dropped into a hanging or vertical position which is out of the fisherman's way when not in use.

It is a yet further object of the invention to provide a fishing line storage device which is adjustable in its configuration such that the position of the device relative to the fisherman, wearer of the device, is adjustable to the various positions a fisherman may have to assume in order to accommodate the terrain while casting and retrieving his lure upon the waters It is a yet further object of the invention to provide a fishing line storage device which is lightweight and of stream-lined, non-bulky contour so that it is unintrusive and never becomes a burden to the busy fly fisherman.

It is yet a further and final object of the invention to provide a fishing line storage device which may be quickly and easily removed from the person of the fisherman and yet again quickly and easily re-attached to his person when needed.

BRIEF DESCRIPTION OF THE DRAWINGS

While the novel features of the instant invention are set forth with particularity in the appended claims, a full and complete understanding of the invention can be had by referring to the detailed description of the preferred embodiment(s) which are set forth subsequently, and which are as illustrated in the accompanying drawings, in which:

FIG. 2 is a perspective view of the stripping plane of the preferred embodiment of the instant invention, showing connection straps, swiveable hinged connection, and protuberances.

FIG. 3 is a perspective view of the belt plate of the preferred embodiment of the instant invention, showing belt, connection straps, and an attachment area providing a surface suitable for use as one-half of a micro loop and hook attachment means.

DESCRIPTION OF THE PREFERRED EMBODIMENT(S)

Figure 1:
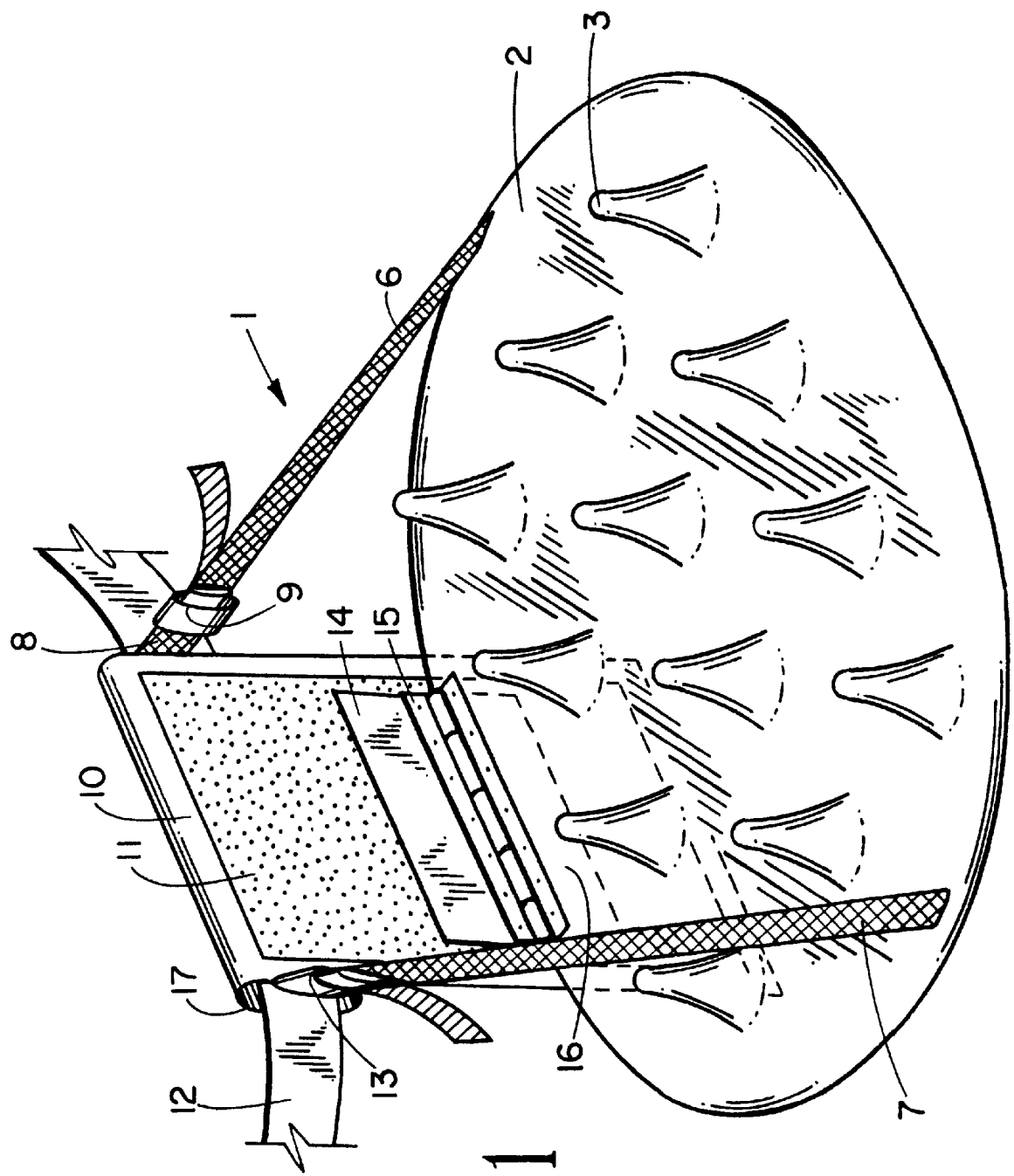
FIG. 1 is a perspective view of the preferred embodiment of the instant invention showing the stripping plane, with its protuberances, swiveably and adjustably connected to the belt plate.

As seen in FIG. 1, the instant invention is of a stripping apron 1 suitable for the accumulation of the fishing line 23 (depicted on FIG. 4) being retrieved by hand 27 (depicted on FIG. 4) by a fly fisherman who is attempting by varying the retrieval speed of the fishing line 23 to simulate with his lure, the movement of an insect across the water's surface. The instant invention comprises a base plate 2, a hinge 15, a mounting plate 14, an apron support mount 10, adjustable straps 6 and 7, and quick disconnect clips 9 and 13. The base plate 2 provides a plurality of slope-surfaced protuberances 3 on its upper surface or face, has straps 6 and 7 connected to its opposite sides, and has connection through the hinge 15 to a mounting plate 14 (numeral 16 being assigned to that portion of the mounting plate 14 hidden behind the base plate 2 in FIG. 1). The mounting plate 14 is connected to the apron support mount 10 by contact between a micro-hook and loop surface area 11 on the apron support mount 10 and the material suited for use in a micro-hook and loop connection system which covers the mounting plate 14 surface facing the apron support mount 10. The apron support mount 10 provides an aperture 17 suitable for threaded passage of a belt 12 which in the preferred embodiment is strapped around the person of the fly fisherman. The straps 6 and 7 are each attached by quick disconnect clips, 9 and 13 respectively, to the strap 8 which in the preferred embodiment depicted in FIG. 1 is a continuous strap threaded through the aperture 17 and connected on one end to the clip 13 and on its other end to clip 9. The size of the aperture 17 in the apron support mount 10 is such as will permit easy threading of the belt 12 though the aperture so that a slideable connection is made between the belt 12 and the apron support mount 10. In the preferred embodiment as depicted in FIG. 1, the size of the aperture 17 is such as will accommodate both the belt 12 and the strap 8. The slideable connection between the belt 12 and the apron support mount 10 permits movement of the base plate 2 laterally around the person of the fly fisherman to a position of most comfort given the demands of the activity being undertaken.

The hinge 15 provides two sides in swiveable connection whereby connection of one of the sides to the base plate 2 and connection of the other of the sides to the mounting plate 14 places the base plate 2 in swiveable connection with the mounting plate 14. The swiveable connection provided by the hinge 15 allows the base plate 2 to fall to a vertical position when the clips 9 and 13 are disconnected. This provides a quick, easy method of getting the base plate 2 of the stripping apron 1 out of the way when not in use, without having to undo the belt 12 connection to the person of the fly fisherman.

The connection between the micro-hook and loop surface area 11 and the material suited for use in a micro-hook and loop connection system on the back side of the mounting plate 14 aids in the quick disconnection of the base plate 2 of the stripping apron 1 from the apron support mount 10 in case merely lowering the base plate 2 to a vertical position is insufficient for the fly fisherman's needs. To disconnect the base plate 2 from the apron support mount 10, the user (fly fisherman) needs merely to unclip the two quick disconnect clips, 9 and 13, and pull apart the micro-hook and loop surface area 11 from the mounting plate 14. Likewise, re-attachment of the stripping apron 1 is accomplished by putting the micro-hook and loop surface area 11 in contact with the rear surface of the mounting plate 14 and clipping together the two quick disconnect clips 9 and 13.

Further, in the preferred embodiment depicted in FIG. 1, the clips 9 and 13 are indicated to be of the type that connects to the straps 6 and 7 respectively in an adjustable fashion. That is, the length of the portion of the strap 6 that is used in the connection between the base plate 2 and the apron support mount 10 may be adjusted at the clip 9; and likewise the length of the portion of the strap 7 that is used in the connection between the base plate 2 and the apron support mount 10 may be adjusted at the clip 13.

The base plate 2 of the stripping apron 1 is seen in FIG. 1 to be slightly convex in shape. This convex upper surface, together with the gently rounded edges of the base plate 2 permit ready water runoff when in use. In normal use, while the fly fisherman is retrieving fishing line 23 (on FIG. 4) the fishing line 23 is wet and water runs off the fishing line 23 onto the base plate 2. An accumulation of water would not be desirable and provision must be made to permit its runoff or drainage from the upper base plate 2 surface. While it is anticipated that the base plate 2 may, itself, be perforated or constructed of porous material to permit water passage through the base plate 2, the preferred embodiment is constructed without perforation and depends upon its convex shape for the escape of water from the upper surface of the base plate 2.

The plurality of slope-surfaced protuberances 3 on the upper surface of the base plate 2 are, in the preferred embodiment, spaced equidistant from one another and are approximately one and one-half inches in height. It has been demonstrated that the use of such slope-surfaced protuberances 3 permits the simple dropping of the fishing line 23 onto the base plate 2 without consideration of whether clumps of fishing line 23 are being formed and without fear that any entanglements of the fishing line 23 will occur. In the drawings accompanying this application, twelve of such slope-surfaced protuberances 3 are depicted in each figure, although the precise number comprising the plurality is not significant. Also, within broad tolerances of 0 in. to approximately 4 in., the spacing between the slope-surfaced protuberances 3 is not significant.

In FIG. 2, in which the base plate 2 is shown in detached proximity to the apron mounting plate 10, it can be seen that a wide range of vertical attachment positions of the base plate 2 to the apron mounting plate 10 are possible in order to accommodate the needs and desires of the user. The vertical mounting position is determined by the user selectable point on the micro-hook and loop surface area 11 at which the back side or face of the mounting plate 14, bearing the material suited for use in a micro-hook and loop connection system, is attached.

Also, in FIG. 2., there is seen an alternate embodiment of the instant invention which provides a strap 19 attached to the apron mounting plate 10 in near proximity to one end of the aperture 17 and a strap 8 attached to the apron mounting plate 10 in near proximity to the other end of the aperture 17. No known advantage for this embodiment over that in FIG. 1 exists, other than the rigid attachment being a protection against loss of the strap. A yet third embodiment, not shown in the figures, provides that the quick disconnect clips, 9 and 13, be directly attached to the apron mounting plate 10.

Further, FIG. 2, considered in conjunction with FIG. 3, exhibits the separation of the quick disconnect clip 9 into its parts, a male part 18 and a female part 22; as well as the separation of the quick disconnect clip 13 into its parts, a male part 21 and a female part 20. Each male part 18 and 21 designed to slideably insert into its respective female part 22 or 20 for quick engagement and disengagement as required for connecting and disconnecting the base plate 2 from the apron mounting plate 10.

Figure 4:
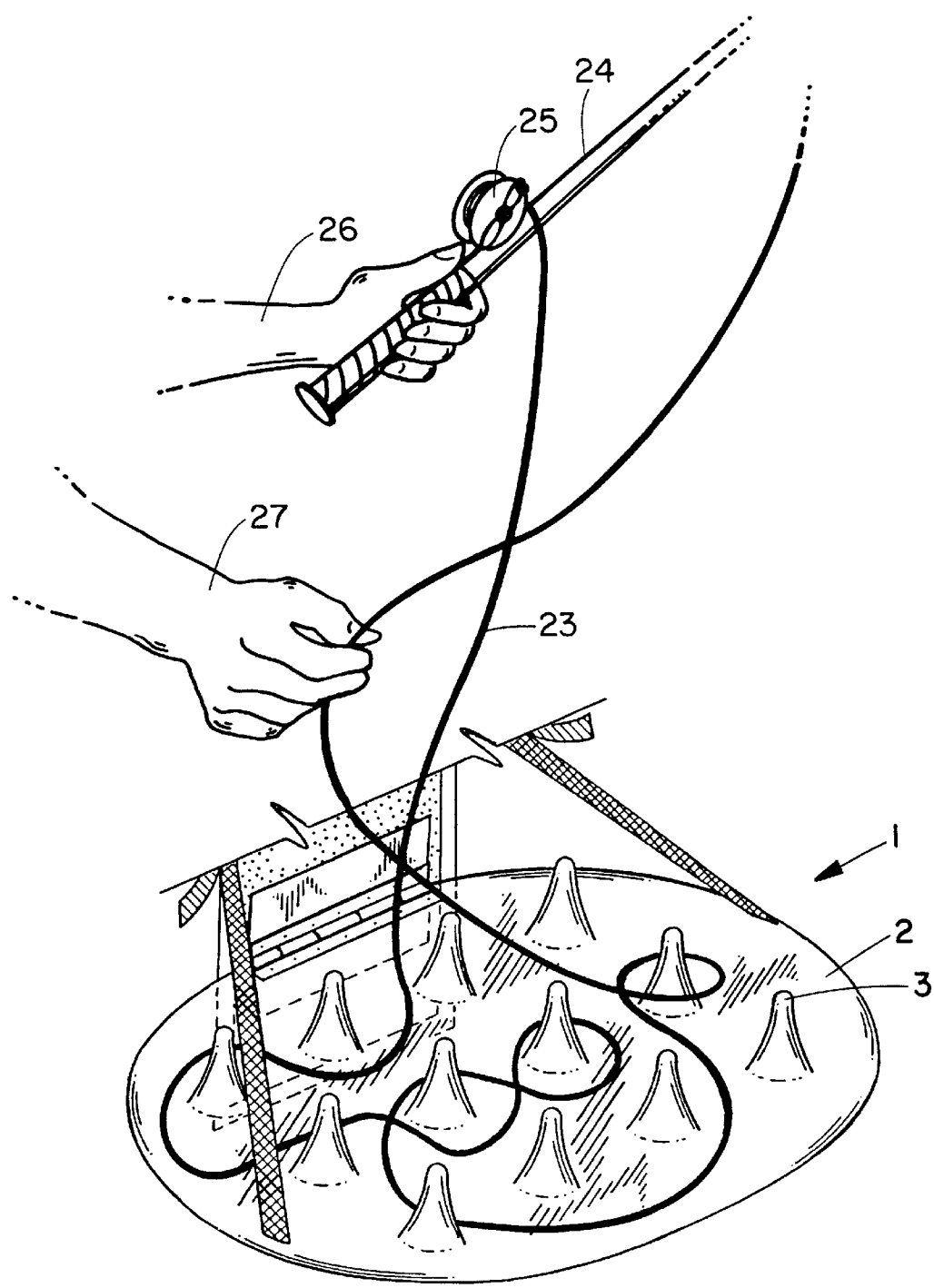
FIG. 4 is a cutaway perspective view of the preferred embodiment in use by a fisherman.

FIG. 4 shows the fly fisherman's use of the stripping apron 1. The fly fisherman's left hand 26 is shown grasping the rod 24 and the reel 25 is shown spooled with fishing line 23. The fly fisherman's right hand 27 is shown dropping fishing line 23 onto the base plate 2. The presence of the slope-surfaced protuberances 3 on the base plate 2 causes the fishing line 23 to fall into coils around the slope-surfaced protuberances 3 in an untangled fashion which can be reeled onto the reel 25 when the fishing action slows.

While the preferred embodiments of the instant invention have been described in substantial detail and fully and completely hereinabove, it will be apparent to one skilled in the art that numerous variations of the instant invention may be made without departing from the spirit and scope of the instant invention, and accordingly the instant invention is to be limited only by the following claims.

I claim:

1. A stripping apron comprising
    a base plate,
    a hinge,
    a mounting plate,
    an apron support mount,
    adjustable straps, and
    quick disconnect clips;
    wherein
        the upper surface of said base plate provides a plurality of slope-surfaced protuberances,
        the first side of said hinge is connected to said base plate,
        the second side of said hinge is connected to said mounting plate,
        the first end of each of said adjustable straps is connected to said base plate,
        the second end of each of said adjustable straps is connected to one of said quick disconnect clips,
        each of said quick disconnect clips may be connected to said apron support mount,
        one face of said mounting plate provides material suited for use in a micro-hook and loop connection system,
        one face of said apron support mount provides a micro-hook and loop surface area, and
        said apron support mount provides an aperture suitable for passage of a belt;
    whereby
        said face of said apron support mount which provides a micro-hook and loop surface area may be connected to said face of said mounting plate which provides material suited for use in a micro-hook and loop connection system,
        said belt is in slideable connection with said apron support mount, and
        said belt may be strapped onto the person of the user of said stripping apron.

2. The apparatus of claim 1 wherein the upper surface of said base plate is convex.

3. The apparatus of claim 1 wherein said base plate is comprised of porous material.

4. The apparatus of claim 1 wherein said base plate provides apertures suitable for the drainage of water from said base plate's upper surface.

5. The apparatus of claim 1 further comprising a second set of straps wherein
    said quick disconnect clips are not connected to said apron support mount,
    the first end of each strap comprising said second set of straps is connected to one of said quick disconnect clips, and
    the second end of each strap comprising said second set of straps is connected to said apron support mount.

6. The apparatus of claim 1 further comprising a second strap wherein
    said quick disconnect clips are not connected to said apron support mount,
    the second strap comprising said second set of straps is threaded through said aperture,
    each end of the second strap is connected to one of said quick disconnect clips.

7. The apparatus of claim 1 further comprising a second set of straps wherein
    the upper surface of said base plate is convex,
    said quick disconnect clips are not connected to said apron support mount,
    the first end of each strap comprising said second set of straps is connected to one of said quick disconnect clips, and
    the second end of each strap comprising said second set of straps is connected to said apron support mount.

* * * * *